Figure 1:
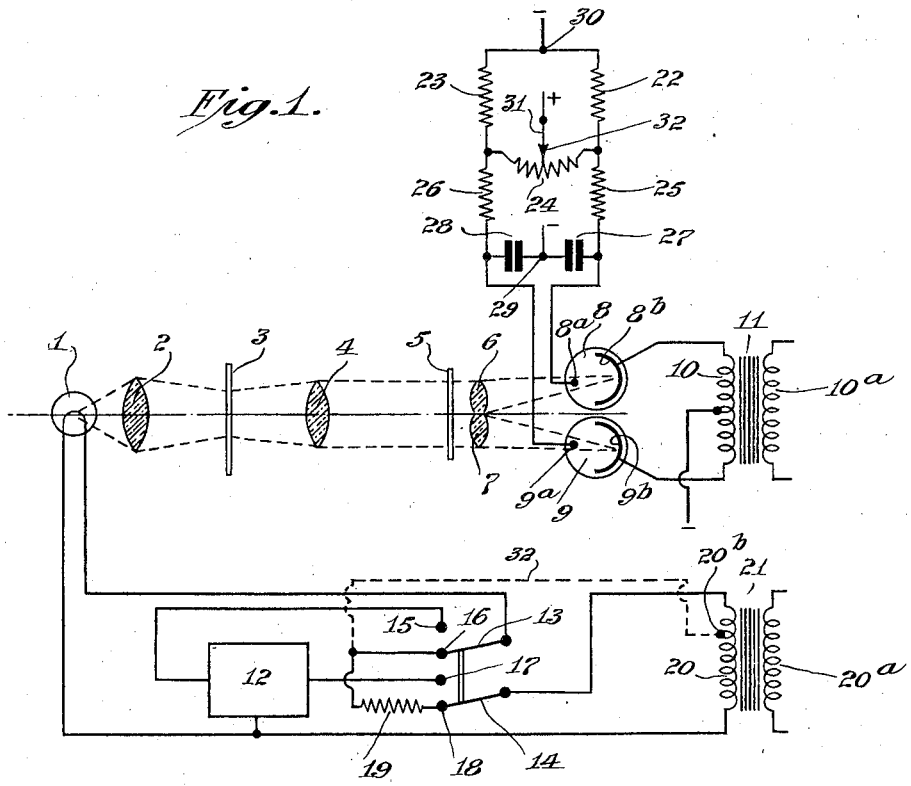

Feb. 27, 1940.   O. K. KOLB   2,191,795
REPRODUCER FOR SOUND FILMS
Filed Oct. 5, 1938

INVENTOR
O. K. Kolb
BY
Paul Kolisch
ATTORNEY

Patented Feb. 27, 1940

2,191,795

UNITED STATES PATENT OFFICE 2,191,795

REPRODUCER FOR SOUND FILMS

Otto Kurt Kolb, Chiswick, London, England, assignor to British Acoustic Films Limited, London, England, a British corporation Application October 5, 1938, Serial No. 233,383
In Great Britain January 19, 1938

7 Claims. (Cl. 179—100.3)

This invention relates to new and useful improvements in reproducers for sound films, and more particularly to reproducers which may be readily adjusted for use with normal and asymmetric records.

As well known, sound films of the push-pull or asymmetric type have been developed which require for their reproduction dual photoelectric systems. It is, of course, essential that equipment adapted to reproduce such films shall also be able to reproduce normal, standard or symmetrical films.

Normal films require for their reproduction a substantially steady light beam for the purpose of energizing the necessary photosensitive devices. This, in turn, necessitates the provision of electrical and thermal means for producing an unvarying light source. On the other hand, when push-pull films are being reproduced, it is a necessary condition that the two photosensitive elements be accurately balanced with regard to their effect on the acoustic output circuit.

Heretofore it has been proposed to use suitable test films and accurate measuring devices for the setting of the means provided for accurately balancing the photoelectric effects. Such means and methods cannot, however, be employed by the operator of the equipment during the actual running of the film and the change over from one type of film to another.

The present invention relates to improvements in photoelectric apparatus for the reproduction of sound films, and provides means whereby the testing of double photosensitive reproducing systems is facilitated and their exact balance and adjustment readily obtained and maintained during the actual running of the film by simple means which can be easily handled by the customary operators of the projecting and reproducing equipment.

According to the present invention circuit-changing means are provided to produce pulsations of audio-frequency, e. g., of a mains frequency or of a multiple thereof, in the light emitted by an exciter lamp. These pulsations may be heard in the monitoring loud speaker if there is a lack of balance in the dual photosensitive system and thus serve for the purpose of testing the balance of the dual photosensitive system.

In combination with such circuit-changing means adjustment means of suitable type are provided in the circuit of each of the two photosensitive devices, whereby their effects upon an output circuit under conditions of equal counter-phase excitation can be accurately balanced and they can in consequence co-act upon the output circuit in such a manner as to produce negligible distortion in the reproduction of the light beam modulated by the film.

More specifically, the circuit-changing means are constructed so that an exciter lamp of any known and suitable kind provided in the usual manner for film reproduction is fed, at the will of an operator, either by rectified and smoothed alternating current, or by unsmoothed alternating current, rectified or unrectified, and preferably of equivalent root-mean-square value.

Figure 2:
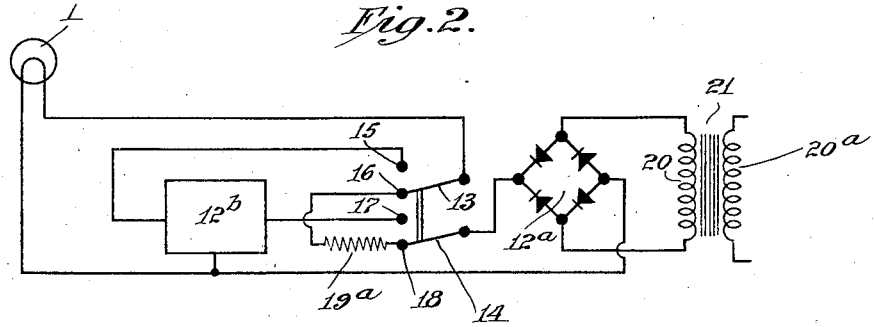

Figs. 1 and 2 of the accompanying drawing diagrammatically illustrate two embodiments of the invention.

In Fig. 1 of the drawing, light from lamp 1 is projected by means of a condensing lens 2 upon a film 3 so as to illuminate a push-pull sound record track thereon.

The light pencil passing through the film is projected by means of an objective lens or lens system 4 upon a mask 5 which bears a slit lying in the plane of the drawing, and forms an image of the illuminated portion of the sound track thereon. The linear slit allows a flat pencil of light corresponding to an element of the sound track to pass through and fall upon beam-dividing optics of known kind, for example, the lenses 6 and 7 which, respectively, project divided pencils of light upon the two photocells 8 and 9.

The light pencils thus falling upon the two photocells are derived individually from the two opposed lateral zones of the push-pull sound track on film 3.

The two cathodes of the photocells 8b and 9b are connected to the center tapped primary winding 10 of the transformer 11 which is provided in the usual way with an output winding 10a. The corresponding anodes 8a and 9a are connected to a balancing potentiometer supply network. This network comprises resistances 22, 23 and 24. Terminals of resistances 22 and 23 are connected to common junction 30 and in series with resistance 24. Upon resistance 24 a sliding contact 32 can be traversed; a direct current source of supply is bridged between the common junction 30 and said sliding contact with its positive pole connected to the latter.

Decoupling resistances 25 and 26 are connected to the junctions of resistances 22 and 24 and 23 and 24, and to the anodes 8a and 9a, the latter being also connected through condensers 27 and 28 to a midpoint 29 which may be the negative pole of the direct current source.

The lamp 1 is fed from transformer 21, the output secondary 20 of which is connected to the switch arm 14 which can alternatively make contact either with a fixed contact 17 or fixed contact 18, and is linked mechanically with a switch arm 13 which makes contact with either contact 15 or contact 16.

When the switch arms are in their upper positions and consequently respectively make contacts with contacts 15 and 17, current is fed to lamp 1 by way of the rectifying and smoothing system 12.

When for testing purposes the switch arms are reversed in position as shown in the drawing and make contact with the fixed contacts 16 and 18, respectively, current passes through lamp 1 from the transformer by way of the compensating resistance 19, which is so dimensioned or adjusted as to produce the same equivalent mean illumination as under the previous conditions.

When the apparatus is in the latter position and the lamp is thus fed with unrectified alternating current as is well known, a ripple of twice the supply frequency can appear in the light emitted from lamp 1. If the photoelectric effects in the two photocells 8 and 9 are not exactly compensatory, current of twice the supply frequency will appear in the output circuit connected to 10a and will give rise to audible hum. This constitutes a test of the balance of the dual photoelectric system. If the hum is present the operator can, by adjustment of the sliding contact 31, bring the photoelectric system to a correct state of balance, which will be indicated by a diminution of the hum to minimum value, or under optimum conditions, by its entire disappearance.

If any residual hum is present, the operator can during film reproduction reverse the switch and operate the system upon the rectified and smoothed current feed.

In an alternative arrangement the resistance 19 may be eliminated and contact 16 may be linked by means of the conductor 32 (shown dotted) to a tapping 20b on winding 30.

In a further modification illustrated in Fig. 2 there is provided a rectifier 12a fed from the transformer 21 and connected to the lamp 1 either through the smoothing circuit 12b, for reproduction, or through the compensating resistance 19a, for testing, by means of the switch elements 13, 14 in their two alternative positions.

The invention is applicable to any of the known arrangements, optical or electrical, by means of which normal or push-pull films can be reproduced by dual photosensitive devices and associated sound reproducing systems.

What is claimed is:

1. In sound film, reproducing and testing apparatus, an exciter lamp, dual photosensitive devices responsive to said lamp, a source of direct current, a source of alternating current, and circuit-changing means for alternatively applying to the exciter lamp alternating current to test the balance of the photosensitive devices and direct current to operate the lamp during reproducing.

2. Apparatus according to claim 1, in which the circuit changing means has a plurality of positions, a rectifying and smoothing system, a compensating resistance, and an energizing circuit for said lamp including said rectifying means in one position and said compensating means in another position of said circuit changing means.

3. Apparatus according to claim 1 and in which the circuit changing means has a plurality of positions, an energizing circuit for the exciter lamp closed in one of said positions and including one tapping of a transformer secondary winding and a rectifying and smoothing system, and another energizing circuit for said lamp closed in a second of said positions and including another tapping of said transformer secondary winding.

4. Apparatus according to claim 1, and in which said circuit changing means has a plurality of positions, a compensating resistance, a smoothing system, an energizing circuit for said exciter lamp closed in one of said positions and including the compensating resistance, and an energizing circuit for said exciter lamp closed in another one of said positions and including said smoothing system.

5. In apparatus for reproducing standard and push-pull films and for testing the reproduction of the latter, dual photosensitive elements, an exciter lamp, and means controlled at will by an operator for operating said lamp to radiate a steady light beam during the reproduction of a film and a pulsatory light beam during the testing of the reproduction of a push-pull film.

6. Apparatus according to claim 5, and in which the means controlled by the operator has a plurality of positions, a rectifying and smoothing system connected with the exciter lamp in one of said positions, and a compensating resistance connected with the exciter lamp in another of said positions.

7. Apparatus according to claim 5, and in which the means controlled by the operator has a plurality of positions, a transformer secondary winding having two tappings, a rectifying and smoothing system, an energizing circuit for said lamp closed in one of said positions and including one tapping and said rectifying and smoothing system for use in reproducing, and an energizing circuit for said lamp closed in another of said positions and including the second tapping for use in testing.

OTTO KURT KOLB.